United States Patent [19]

Taipale et al.

[11] Patent Number: 5,762,040
[45] Date of Patent: Jun. 9, 1998

[54] CYLINDER WALL FUEL INJECTION SYSTEM FOR LOOP-SCAVENGED, TWO-CYCLE INTERNAL COMBUSTION ENGINE

[75] Inventors: Dale L. Taipale, Fond du Lac; Leonard S. Hummel, Eldorado, both of Wis.

[73] Assignee: Brunswick Corporation, Lake Forest, Ill.

[21] Appl. No.: 794,381

[22] Filed: Feb. 4, 1997

[51] Int. Cl.⁶ .................................. F02B 3/00; F01P 1/06
[52] U.S. Cl. ................... 123/299; 123/41.31; 123/58.1; 123/73 C; 123/303; 123/305; 123/514
[58] Field of Search .................................. 123/303, 305, 123/73 C, 73 PP, 73 B, 73 V, 300, 456, 470, 41.31, 509, 514, 516, 541, 59.7, 299, 58.1

[56] References Cited

U.S. PATENT DOCUMENTS

| | | | |
|---|---|---|---|
| 3,026,862 | 3/1962 | Fisher | 123/136 |
| 3,196,926 | 7/1965 | Gartland | 158/36.3 |
| 3,831,563 | 8/1974 | Brittain et al. | 123/32 EA |
| 3,835,822 | 9/1974 | Mickle et al. | 123/41.31 |
| 3,993,030 | 11/1976 | Jaulmes | 123/32 R |
| 4,446,830 | 5/1984 | Simko et al. | 123/276 |
| 4,491,117 | 1/1985 | Koide | 123/541 |
| 4,721,075 | 1/1988 | Kasai | 123/90.23 |
| 4,768,492 | 9/1988 | Widmer et al. | 123/541 |
| 4,787,343 | 11/1988 | Tuckey | 123/59 EC |
| 4,790,270 | 12/1988 | McKay et al. | 123/73 C |

(List continued on next page.)

FOREIGN PATENT DOCUMENTS

0302045 B1   7/1988   European Pat. Off. .

OTHER PUBLICATIONS

A Study of Two–Stroke Cycle Fuel Injection Engines for Exhaust Gas Purification, Yamagishi et al., Automotive Engineering and Exposition, Jan., 1972, pp. 253–272.

Fuel Injection of a Two–Stroke Cycle Spark Ignition Engine, R. Douglas et al., SAE The Engineering Resource for Advancing Mobility, #820952, Aug. 16–19, 1982, pp. 1–14.

Low–Pressure Discontinuous Gasoline Injection in Two–Stroke Engines, Grasas–Alsina et al., SAE The Engineering Resource for Advancing Mobility, #860168, Feb. 24–28, 1986, pp. 1–14.

The Nozzle Location and the Shape of Its Surroundings in the Cylinder of Small Two–Stroke Engine, Francisek et al., SAE The Engineering Resource For Advancing Mobility, #860169, Feb. 24–28, 1986, pp. 1–7.

(List continued on next page.)

*Primary Examiner*—Willis R. Wolfe
*Assistant Examiner*—Hieu T. Vo
*Attorney, Agent, or Firm*—Andrus, Sceales, Starke & Sawall

[57] ABSTRACT

A loop-scavenged, two-cycle internal combustion engine has a low-pressure, cylinder wall fuel injection system that is practical for multi-cylinder marine engines and also reduces the amount of unburned hydrocarbons in exhaust emissions when compared to conventional carbureted two-cycle engines. The fuel injectors are mounted through the cylinder wall so that fuel spray contacts the piston crown underneath a zone in which incoming air flow through the transfer ports converges. The converging air flow helps to convect vaporized fuel from the piston crown upwards towards the spark plug electrode in the combustion chamber and away from the exhaust port, thereby reducing the likelihood of short circuiting unburned fuel through the exhaust port before the exhaust port closes and compression begins. All fuel is injected into the piston cavity before the exhaust port closes. In a multi-cylinder engine, all of the fuel injectors are mounted to have parallel spray axes and coplanar top ends, thus allowing the use of a straight fuel rail and convenient mounting techniques. Low-pressure fuel (e.g., 40 to 100 psi) is provided to the fuel rail and to the fuel injectors, and operation of the fuel injectors is controlled by an electronic control unit. Two fuel injectors can be provided for each cylinder to provide additional fuel injection capabilities. Various systems are disclosed for supplying pressurized fuel to the fuel rail.

48 Claims, 7 Drawing Sheets

U.S. PATENT DOCUMENTS

| | | | |
|---|---|---|---|
| 4,941,999 | 7/1990 | Noisier | 261/130 |
| 5,020,485 | 6/1991 | Watanabe | 123/73 |
| 5,058,548 | 10/1991 | Morikawa et al. | 123/298 |
| 5,078,167 | 1/1992 | Brandt et al. | 123/549 |
| 5,103,793 | 4/1992 | Riese et al. | 123/516 |
| 5,156,134 | 10/1992 | Tochizawa | 123/541 |
| 5,335,635 | 8/1994 | Kadoi et al. | 123/295 |
| 5,389,245 | 2/1995 | Jaeger et al. | 210/129 |
| 5,404,856 | 4/1995 | Servati | 123/478 |
| 5,450,830 | 9/1995 | Katoh | 123/443 |

OTHER PUBLICATIONS

Mixture injection application for avoiding charge exchange losses in two–stroke cycle engines, Kuntscher et al., IMechE, 1989, C372/025, pp. 117–122.

Fuel Atomization With Mixture Preparation Systems of SI–Engines, Lenz et al., #885015, pp. 1.109–1.117.

Comparative Investigation on Fuel Feed Methods in Two–Stroke, Cycle Methanol Engine, Kubota et al., SAE International, #922312, Oct. 19–22, 1992, pp. 1652–1659.

Gasoline Direct Injection for a Loop–Scavenged Two–Stroke Cycle Engine, Sato et al., SAE #871690, Sep. 14–17, 1987, pp. 1–14.

Direct Fuel Injection: Piaggio Approach to Small 2T SI Engines, Nuti, SAE #880172, Feb. 29—Mar. 4, 1988, pp. 1–17.

Low–Pressure Electronic Fuel Injection System for Two–Stroke Engines, Vieilledent, Society of Automotive Engineers, Technical Paper Series, #780767, Sep. 11–14, 1978, pp. 1–14.

200 DFI (Direct Fuel Injected) Service Manual, Brunswick Corp., 90–850153R1, Mar. 1996, p. 36.

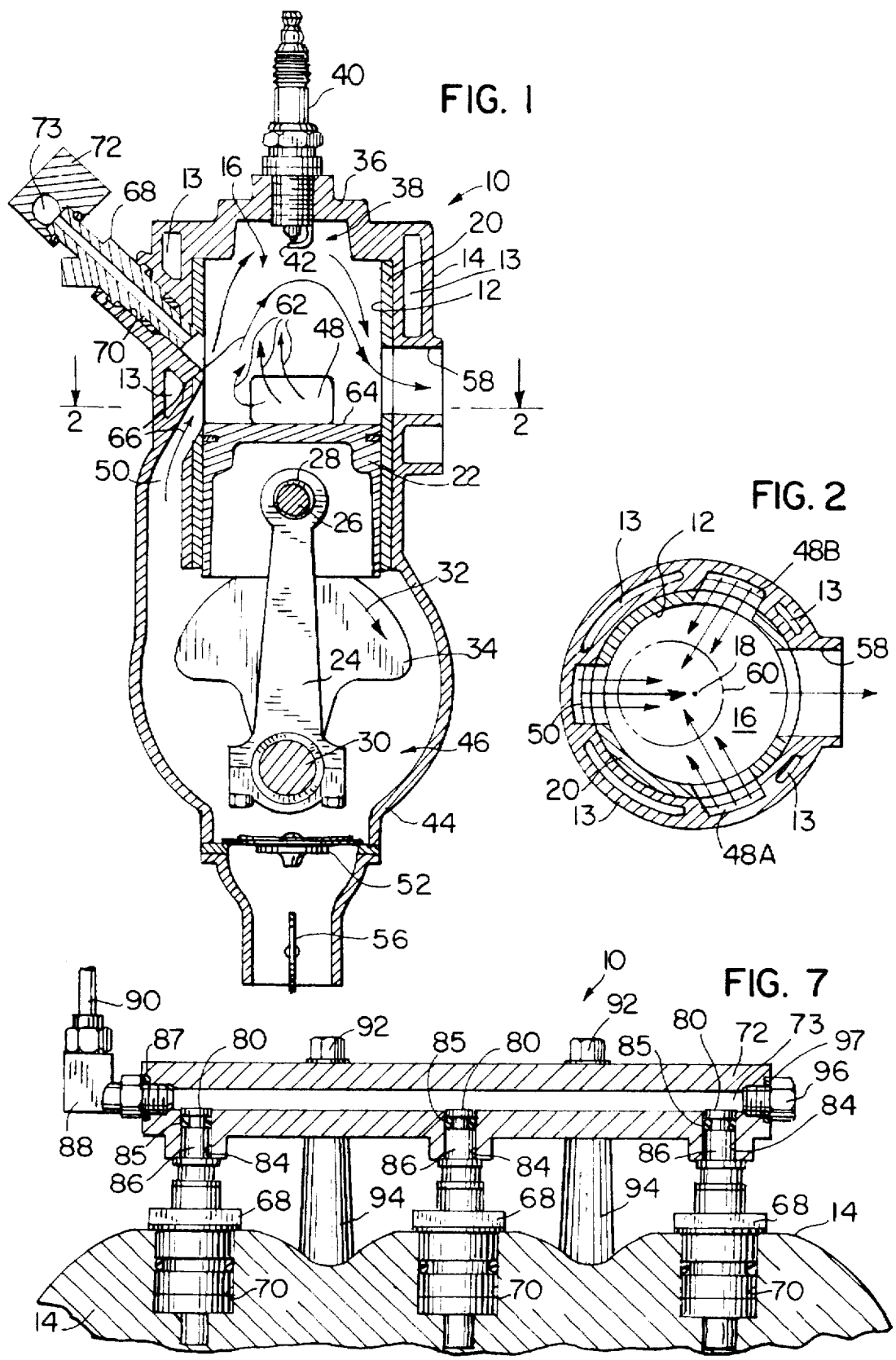

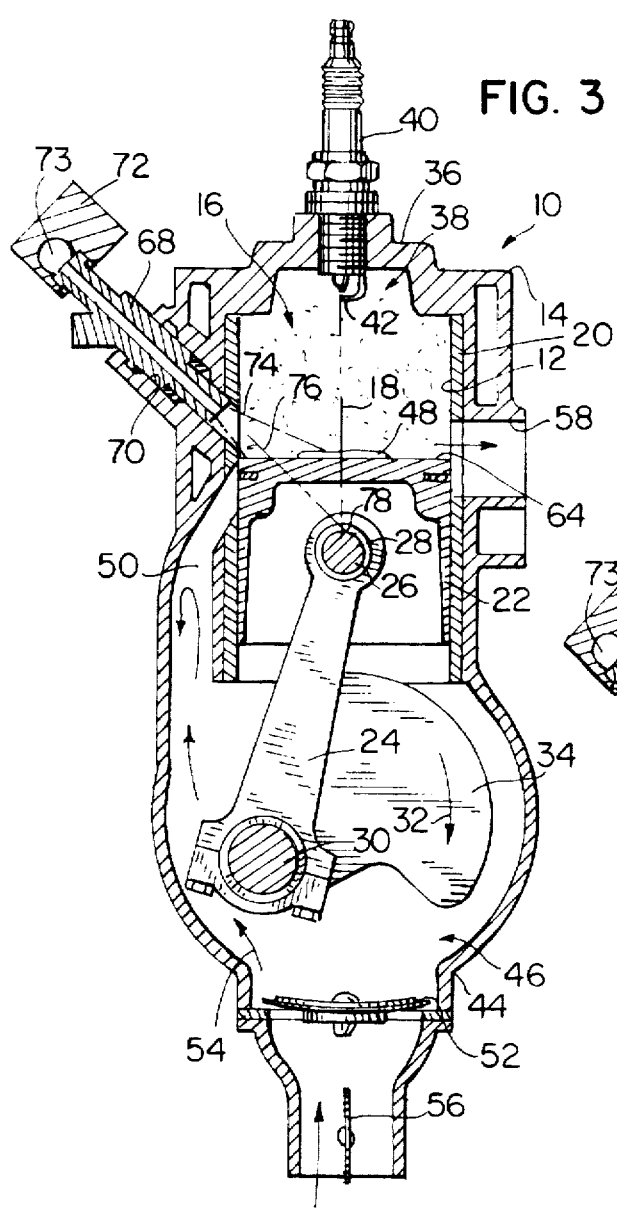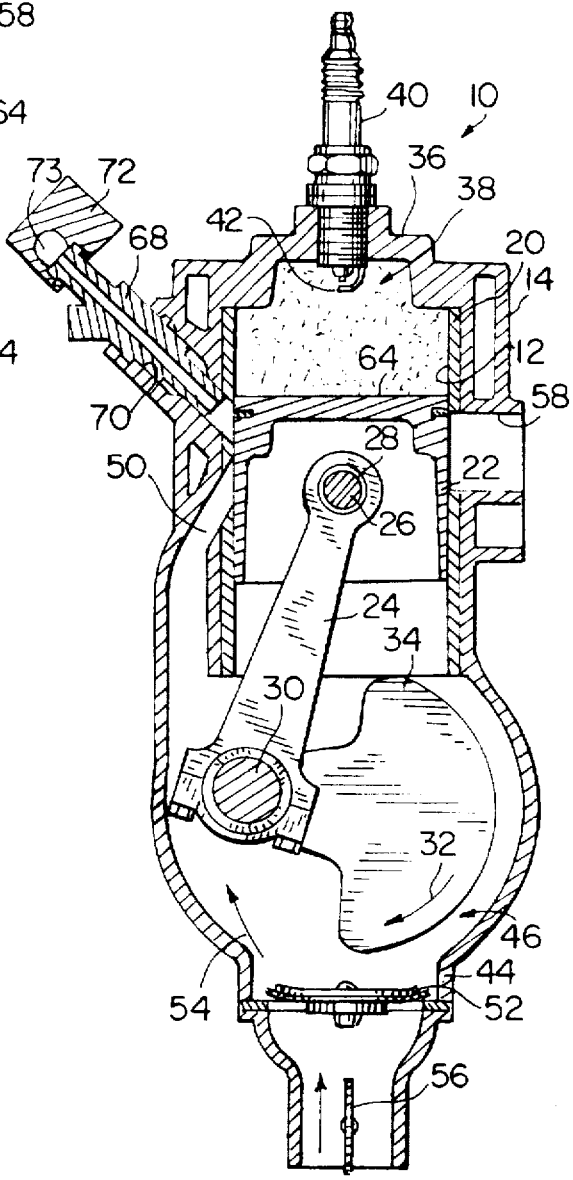

CYLINDER WALL FUEL INJECTION SYSTEM FOR LOOP-SCAVENGED, TWO-CYCLE INTERNAL COMBUSTION ENGINE

FIELD OF THE INVENTION

The invention relates to fuel supply and fuel injection systems for loop-scavenged, two-cycle internal combustion engines. The invention is particularly applicable to low-pressure, cylinder wall fuel injection systems in two-cycle marine engines.

BACKGROUND OF THE INVENTION

Multi-cylinder, two-cycle internal combustion engines are commonly used in the marine industry for propulsion. Two-cycle engines are often used in outboard motors and in jet propelled watercraft. Emissions from conventional two-cycle engines having carburetors can contain excessive amounts of unburned hydrocarbons for soon to be implemented environmental regulations, especially when operating at low speeds or idle.

In a two-cycle engine having a carburetor, fuel is mixed with intake air at the carburetor upstream of the combustion cylinders. Therefore, the air used to scavenge exhaust out of the combustion cylinder is mixed with fuel. Because the scavenging process is not perfect, some of the incoming fuel/air mixture passes directly through the exhaust port without being combusted. This phenomenon is called short circuiting, and is a significant source of unburned hydrocarbons in emissions from conventional two-cycle engines.

Replacing carburetors with electronic fuel injectors that inject fuel directly into the combustion cylinder substantially reduces the amount of unburned hydrocarbons in the engine exhaust as long as fuel injection is timed and coordinated so that very little fuel can escape through the exhaust port during the scavenging process.

Injecting fuel into the combustion cylinder after the piston has covered the exhaust port is one way to assure that fuel injected into the combustion cylinder will not short circuit through the exhaust port before the combustion process is completed. However, as the piston moves to cover the exhaust port, the volume in the combustion chamber above the piston is reduced and the pressure within the piston cavity increases greatly. Therefore, at the time of fuel injection, pressure within the piston cavity is relatively high (e.g. 100 psi or greater). Systems that inject fuel after the piston covers the exhaust port require a high-pressure fuel injection system which normally uses a high-pressure pump to facilitate injection of fuel into the high-pressure environment within the piston cavity during compression.

On the other hand, relatively low-pressure fuel injection systems (e.g. 40 to 100 psi) can be used to inject fuel into the combustion chamber before the piston covers the exhaust port when pressure in the combustion chamber is nearly ambient. In these systems, it is typical for the fuel injectors to be mounted through the cylinder wall, i.e. cylinder wall fuel injection systems (CWI).

Such a low-pressure cylinder wall fuel injection system can use conventional, low-cost fuel injectors without sacrificing proper control over fuel spray injection into the piston cavity. However, in such a system it is important to coordinate fuel injection so that the injected fuel does not short circuit, and directly pass through the exhaust port unburned. The coordination of fuel injection is complicated due to the various fuel requirements of the engine over various engine operating speeds and the throttle settings. For instance, fuel requirements while the engine is accelerating or idling are substantially different than fuel requirements while the engine is accelerating or operating at top speed.

BRIEF SUMMARY OF THE INVENTION

The invention is a low-pressure, cylinder wall fuel injection system for a two-cycle internal combustion engine that optimizes the direction of fuel injection into the piston cavity to reduce the potential of short circuiting unburned fuel through the exhaust port both when the engine is idling, and when the engine is running at higher speeds. The system is a practical, low-cost alternative to high pressure fuel injection systems for two-cycle internal combustion engines.

In one aspect, the invention is useful in a loop-scavenged two-cycle engine having a first and second transfer port directed so that air flow from the transfer ports converges in the piston cavity within a zone of convergence that is centered on the side of a longitudinal cylinder axis opposite the exhaust port. The transfer ports are preferably directed so that air flows away from the exhaust port. A fuel injector is mounted through the wall of the combustion cylinder. Two fuel injectors can be used to supply fuel to each cylinder if desired. The spray axes of the fuel injectors is directed at the zone of convergence. The fuel spray impinges the piston crown underneath the zone of convergence. The piston crown is very hot when the engine is operating, and liquid fuel droplets vaporize upon contacting the piston crown, thereby enhancing combustion efficiency. The converging air flow from the transfer ports ascends upward away from the piston towards the spark plug electrode in the combustion chamber. Therefore, after fuel is vaporized on the crown of the piston underneath the zone of convergence, the converging air flow from the transfer ports convects the vaporized fuel upward towards the spark plug electrode in the combustion chamber and away from the exhaust port. This low-pressure, cylinder wall fuel injection scheme therefore reduces the likelihood of short circuiting unburned fuel through the exhaust port even when the engine is operating at high speeds and fuel is injected into the piston cavity early during the cycle. This is true even though the fuel injectors are positioned so that all fuel is injected into the piston cavity before the exhaust port closes.

The fuel injectors are preferably mounted through the combustion cylinder wall so that the spray axis of the fuel injector is located about 150° around the cylinder wall from a centerline of the exhaust port. This is advantageous for a number of reasons. First, this configuration makes it unlikely that fuel will spray from the fuel injector directly through the exhaust port. Moreover, this configuration allows the use of a straight fuel rail in a multi-cylinder engine having a conventional engine block for a loop-scavenged engine in which the cylinder ports are nested. The fuel rail has a common fuel canal that provides pressurized fuel (e.g., 40 to 100 psi) to each of the fuel injectors. An electronic control unit controls the operation of the fuel injectors at the constant pressure by opening and closing the fuel injectors. The straight fuel rail provides a simple, effective way to secure the fuel injectors in place on the engine. To use the straight fuel rail, the inlet stem for each of the fuel injectors should have a top end that is coplanar with the top ends of the other fuel injectors. The straight fuel rail is conveniently positioned over the coplanar top ends of the fuel injectors. It is preferred that the fuel rail be secured to mounting bosses on the engine block with the fuel injectors disposed between the fuel rail and the engine block. Such a system is particularly easy to service, especially if the fuel rail is easily accessible.

In another aspect, the invention provides a system for supplying pressurized fuel (e.g., 40 to 100 psi) to the fuel rail which is suitable for the low-pressure, cylinder wall fuel injectors. In a watercraft having a fuel tank and an engine located in an engine compartment between a hull and a deck, the fuel supply system preferably includes a fuel pump located in the fuel tank, a pressurized fuel line from the fuel pump to the fuel rail, a pressure regulator that regulates the pressure in the pressurized fuel line, and an electronic control unit that controls the operation of the fuel injectors. Preferably, a pressure sensor senses the fuel pressure in the pressurized fuel line and creates a signal that is monitored by the electronic control unit. The electronic control unit preferably limits engine spark advance if the pressure sensor indicates insufficient fuel pressure to prevent engine failure.

Several embodiments of a suitable fuel supply system for the low-pressure, cylinder wall fuel injection system are disclosed for an outboard motor. The outboard fuel supply systems include a first pump that is removably connected to an unpressurized fuel line from a fuel tank located in the boat. The first pump is preferably a low-pressure diaphragm pump driven by oscillating crankcase pressures. The first fuel pump pumps fuel through a fuel filter to a fuel reservoir located within the outboard motor. A second fuel pump is located in the fuel reservoir and supplies pressurized fuel through a pressurized fuel line to the fuel rail. The fuel rail in turn supplies pressurized fuel to the low-pressure fuel injectors. An electronic control unit controls the operation of the fuel injectors.

In one fuel supply system disclosed for a low-pressure, cylinder wall fuel injection system in an outboard motor, the electronic control unit controls the pressure of the fuel in the pressurized fuel line and the fuel rail by controlling the operation of the second fuel pump in the fuel reservoir via pulse width modulation. In this system, it may be further desirable to use a pressure regulator in the fuel reservoir to regulate the pressure in the pressurized fuel line from the second pump.

The other fuel supply systems disclosed for a low-pressure, cylinder wall fuel system in an outboard motor involve the use of a continuous duty fuel pump. In these systems, the second fuel pump providing pressurized fuel to the fuel rail operates continuously. The system requires a mechanical regulator to regulate the pressure in the pressurized fuel line from the continuous duty pump and in the fuel rail, and allow excessive fuel to flow through a fuel return line to the fuel reservoir. It is preferred that the fuel reservoir be a vapor separation tank. Furthermore, in these systems, cooling the fuel and/or the continuous duty pump reduces fuel supply problems that can occur because of heat generated by the continuous duty fuel pump. In the first system having a continuous duty pump, the fuel rail includes a cooling duct to allow cooling media to flow through the fuel rail to cool the fuel flowing through the fuel rail. In the second system having a continuous duty pump, an in-line fuel cooler is provided in the fuel return line to the fuel reservoir. In a third system having a continuous duty pump, a flow of coolant around the continuous duty pump is used to cool the pump.

Other objects and advantages of the invention may be apparent to those skilled in the art upon reviewing the drawings and the following description thereof.

BRIEF DESCRIPTION OF THE DRAWINGS

FIG. 1 is a side view of a combustion cylinder for a loop-scavenged, two-cycle internal combustion engine having a low-pressure, cylinder wall fuel injection system in accordance with the invention in which a piston is positioned at bottom dead center.

FIG. 2 is a view taken along lines 2—2 in FIG. 1.

FIG. 3 is a view similar to FIG. 1 in which the piston has moved upward to partially cover the exhaust port in the combustion cylinder.

FIG. 4 is a view similar to FIGS. 1 and 3 in which the piston has moved further upward to completely cover the exhaust port in the combustion cylinder.

FIG. 7 is a view taken along line 7—7 in FIG. 5.

DETAILED DESCRIPTION OF THE DRAWINGS

Figure 5:
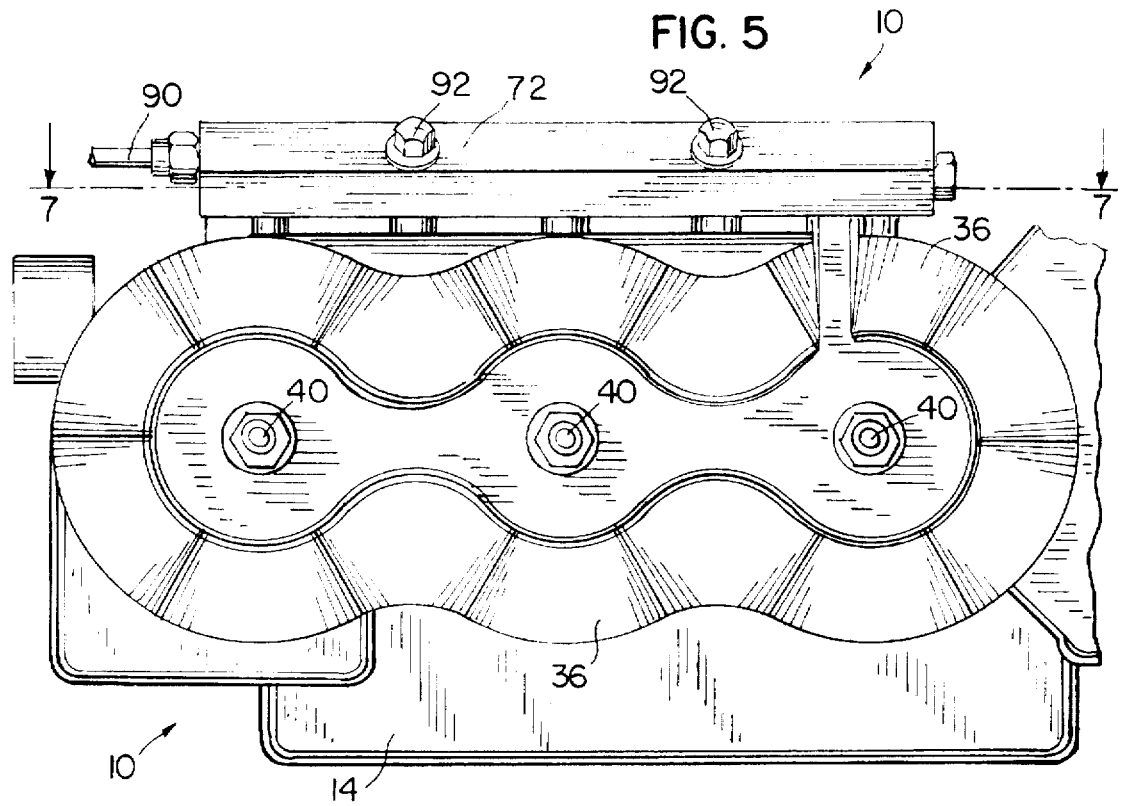
FIG. 5 is a top view of a three-cylinder engine block and accompanying fuel supply system in accordance with the invention.

The invention involves the use of a low-pressure fuel supply system and cylinder wall fuel injection for an internal combustion engine 10. The engine 10 preferably has a plurality of parallel combustion cylinders 12, FIGS. 5 and 6. FIGS. 1–4 illustrate the structure and operation of the low-pressure, cylinder wall fuel injection system in reference to a single combustion cylinder 12.

Referring to FIGS. 1–4, the engine 10 is a loop-scavenged, two-cycle internal combustion engine 10. The engine 10 includes a water-cooled engine block 14. Liquid coolant flows through cooling jackets 13 in the engine block 14 to cool the engine 10. The engine block 14 includes combustion cylinder 12 which defines a piston cavity 16 having a substantially cylindrical shape around a longitudinal cylinder axis 18. FIG. 2. A piston sleeve 20 is preferably fitted into the cylinder block 14 to precisely define the piston cavity 16 as is well known in the art.

A piston 22 reciprocates longitudinally through the piston cavity 16 along the cylinder axis 18. The piston 22 is connected to a connecting rod 24 via a piston pin 26 that is attached to the piston 22. The connecting rod 24 includes a bearing mechanism 28 around the piston pin 26 as is known in the art. The connecting rod 24 is attached to a crankshaft 30. When the engine 10 is operating, the piston 22 reciprocates longitudinally through the piston cavity 16 and moves the connecting rod 24 to drive crankshaft 30 in a clockwise pattern as indicated by arrow 32 on counterweight 34, as is well known in the art.

A cylinder head 36 connected to or integral with the cylinder block 14 closes off the combustion cylinder 12 to define a combustion chamber 38 that is in communication with the piston cavity 16 above the piston 22. A spark plug 40 is mounted through the cylinder head 36 so that a spark plug ignition electrode 42 is exposed to the combustion chamber 38.

A crankcase 44 is connected to the cylinder block 14 and defines a charging chamber 46. The charging chamber 46 is in communication with the piston cavity 16 on the side of the piston 22 opposite the combustion chamber 38. The cylinder 12, as shown in FIGS. 1–4 as well as FIGS. 5 and 6, includes two transfer ports 48A and 48B and a boost port 50. The transfer ports 48A, 48B and the boost port 50 pass through the engine block 14 from the charging chamber 46 below the piston 22 into the portion of the piston cavity 16 communicating with the combustion chamber 38, which is above the piston 22 when the piston 22 is at bottom dead center, FIG. 1.

Referring in particular to FIG. 3, fresh air enters the charging chamber 46 in the crankcase 44 through one-way reed valve 52 as indicated by arrow 54 when the piston 22 moves from bottom dead center upward. The amount of air flowing through reed valve 52 is controlled by the position of throttle body 56 which is positioned upstream of the one-way reed valve 52. FIG. 1 illustrates the scavenging process after combustion when piston 22 moves downward through piston cavity 16. As the piston 22 moves downward in the piston cavity 16, the pressure in the charging chamber 46 increases, thus closing reed valve 52 and pushing fresh air through the transfer ports 48A, 48B and the boost port 50 into the portion of the piston cavity 16 above the piston 22 communicating with the combustion chamber 38. The fresh charge of air through the transfer ports 48A, 48B and boost port 50 flows through the cylinder wall into the piston cavity 16 to begin scavenging combustion products through exhaust port 58. In the preferred embodiment, the transfer ports 48A and 48B are symmetrically located with respect to the exhaust port 58 across the combustion chamber. In addition, it is preferred that the boost port 50 be located symmetrically between the transfer ports 48A and 48B.

Referring in particular to FIG. 2, the transfer ports 48A, 48B are oriented so that air flowing from the transfer ports 48A, 48B into the piston cavity 16 is directed away from the exhaust port 58, and also preferably so that air flow from the transfer ports 48A, 48B into the piston cavity 16 is relatively horizontal with respect to the longitudinal cylinder axis 18 as air initially flows into the piston cavity 16. The air flow from transfer port 48A converges with the air flow from transfer port 48B in the piston cavity 16 within a zone of convergence 60. The zone of convergence 60 is located within the piston cavity 16 so that the center of the zone of convergence 60 is on the side of the longitudinal cylinder axis 18 opposite the exhaust port 58. When the flow of air from transfer port 48A converges with the flow of air from transfer port 48B in the zone of convergence 60, the converged air flow ascends upward towards the spark plug electrode 42 as indicated by arrows 62 in FIG. 1. The converged air flow from the transfer ports 48A and 48B cannot descend in the piston cavity 16 because of the presence of the piston crown 64.

The boost port 50 enters the piston cavity 16 180° around the cylinder 12 from the centerline of the exhaust port 58. The boost port 50 is configured so that air flowing from the boost port 50 into the piston cavity 16 flows upward towards the spark plug electrode 42 as indicated by arrows 66, FIG. 1. Air flow through the boost port 50 is typically substantially less than air flow through the transfer ports 48A and 48B. The purpose of the boost port 50 is to help scavenge the area of the piston cavity 16 directly in front of the boost port 50. It is advantageous that the direction of air flow from the boost port 50 into the piston cavity 16 be upward towards the spark plug electrode 42 so that air flow from the boost port 50 does not push the zone of convergence 60 of the flow from the transfer ports 48A, 48B towards the exhaust port 58.

An electrically controlled low-pressure fuel injector 68 is mounted in an opening 70 through the cylinder block 14. The opening 70 through the cylinder block 14 continues to pass through the cylinder sleeve 20 into the piston cavity 16. The fuel injector 68 receives fuel from a fuel rail 72 at a relatively low-pressure, for example 40 to 100 psi. Fuel rail 72 includes a fuel supply canal 73 which supplies fuel to the fuel injector 68. The fuel injector 68 is opened and closed by an electronic control unit. The timing of fuel injection into the piston cavity 16 is dependent on several factors, including throttle position, engine load and engine speed, etc.

At the location where opening 70 through the engine block 14 and the cylinder sleeve 20 opens into the piston cavity 16, a substantial portion of the opening 70 is located below the top surface of the exhaust port 58. Thus, all fuel is injected before the exhaust port 58 closes. This means that the pressure within the piston cavity 16 is very nearly atmospheric during the time that fuel is injected into the piston cavity 16. One of the advantages of cylinder wall fuel injection (CWI) in two-cycle engines, especially when fuel injection is accomplished before closure of the exhaust port, is that relatively low-pressure fuel injectors 68 can be used without compromising fuel injection efficiency and control.

When the fuel injector 68 is open, a spray of fuel 74 is injected from the fuel injector 68 into the piston cavity 16. The opening 70 through the cylinder block 14 and the cylinder sleeve 20 is oriented so that the center axis 76 of the fuel spray 74 from the fuel injector 68 is directed at an angle greater than about 40° with respect to a plane normal to the longitudinal cylinder axis 18 (i.e., at an angle greater than about 40° with respect to the piston crown 64 when the piston 22 is at bottom dead center). The longitudinal cylinder axis 18 and the fuel injector spray axis 76 intersect at a location 78, FIG. 3, which is below the piston crown surface 64 when the piston 22 is at bottom dead center. Thus, the injector spray axis 74 intersects the piston crown surface 64 within the zone of convergence 60, FIG. 2, of the incoming fresh charge of air through the transfer ports 48A, 48B. It is preferred that the fuel injector spray axis 76 be directed at an angle of 45° with respect to the piston crown 64.

The spray 74 of fuel from the fuel injector 68 impinges on the piston crown 64 which is very hot when the fuel hits the piston crown 64. Many if not most of the liquid spray droplets vaporize upon contacting the piston crown 64. Vaporized fuel burns more efficiently than liquid fuel droplets.

When the engine 10 is operating at low speeds or idling, it is desirable that fuel be injected into the piston cavity 16 late in the cycle (yet before the exhaust port 58 closes) to reduce the likelihood of short circuiting unburned fuel through the exhaust port 58. FIGS. 1, 3 and 4 generally illustrate the operation of the cylinder wall fuel injection system in an idling engine 10. FIG. 1 shows the piston 22 at bottom dead center, and illustrates that fresh air has been forced into the piston cavity 16 through boost port 50 and transfer ports 48A, 48B to scavenge the piston cavity 16 of exhaust. In FIG. 1, fuel is not yet being injected into the piston cavity 16. FIG. 3 shows the piston 22 along its upward stroke, and shows the fuel being injected into the piston cavity 16 directly onto the piston crown 64. Liquid droplets in the fuel spray 74 vaporize upon contact with the piston crown 64. Emissions of unburned fuel through the exhaust port 58 are minimized because fuel is injected into the piston cavity late in the cycle. FIG. 4 illustrates the piston moving upward at the beginning of the compression stroke.

As engine speed increases, more fuel needs to be added to the piston cavity 16 and this requires that injection into the piston cavity 16 begin earlier in the cycle. For instance, at medium or high speeds, it may be necessary to begin spraying fuel into the piston cavity 16 when the piston cylinder 22 is at bottom dead center, FIG. 1, or before. Thus, at medium or high speeds, fuel is sprayed into the piston cavity 16 and contacts the piston crown 64 underneath the zone of convergence 60 of the fresh air flowing into the piston cavity 16 through the transfer ports 48A and 48B. Liquid droplets in the fuel spray will vaporize upon contacting the piston crown 64, and the ascending flow of air (i.e. arrows 62) towards the spark plug electrode 42 from the zone of convergence 60 helps to convect the vaporized fuel upwards towards the spark plug electrode 42. Short circuiting of unburned fuel through the exhaust port 58 is reduced due to the converging air flow from the transfer ports 48A and 48B which in effect blows vaporized fuel from the piston crown 64 both away from the exhaust port 58 and upward towards the spark plug electrode 42.

Air flow into the piston cavity 16 through the transfer ports 48A and 48B and the boost port 50 as shown in FIGS. 1 and 2 occurs mostly during the downstroke of the piston 22 after the piston has uncovered the ports 48A, 48B and 50. Thus, it is practical to locate the fuel injector opening 70 so that the lower edge of the opening 70 through the cylinder wall is at essentially the same height as the top of the transfer ports 48A and 48B, or slightly above. Placing the fuel injector 68 so that the spray axis 76 enters into the piston cavity 16 at a height above the top of the transfer ports 48A and 48B and below the top of the exhaust port 58 assures that fuel will not be injected into the piston cavity 16 until the pressure within the cavity 16 is essentially atmospheric yet not before the converging air flow from the transfer ports 48A and 48B will be present in the piston cavity to convect vaporized fuel from the piston crown 64 upward towards the spark plug electrode 42. It can therefore be appreciated that the cylinder wall fuel injection system as described thus far not only allows the use of low-pressure fuel injectors, but also optimizes the use of converging air flows from transfer ports 48A and 48B to reduce short circuiting of unburned fuel even when fuel is injected into the cylinder 16 during the piston downstroke or soon thereafter.

Figure 6:
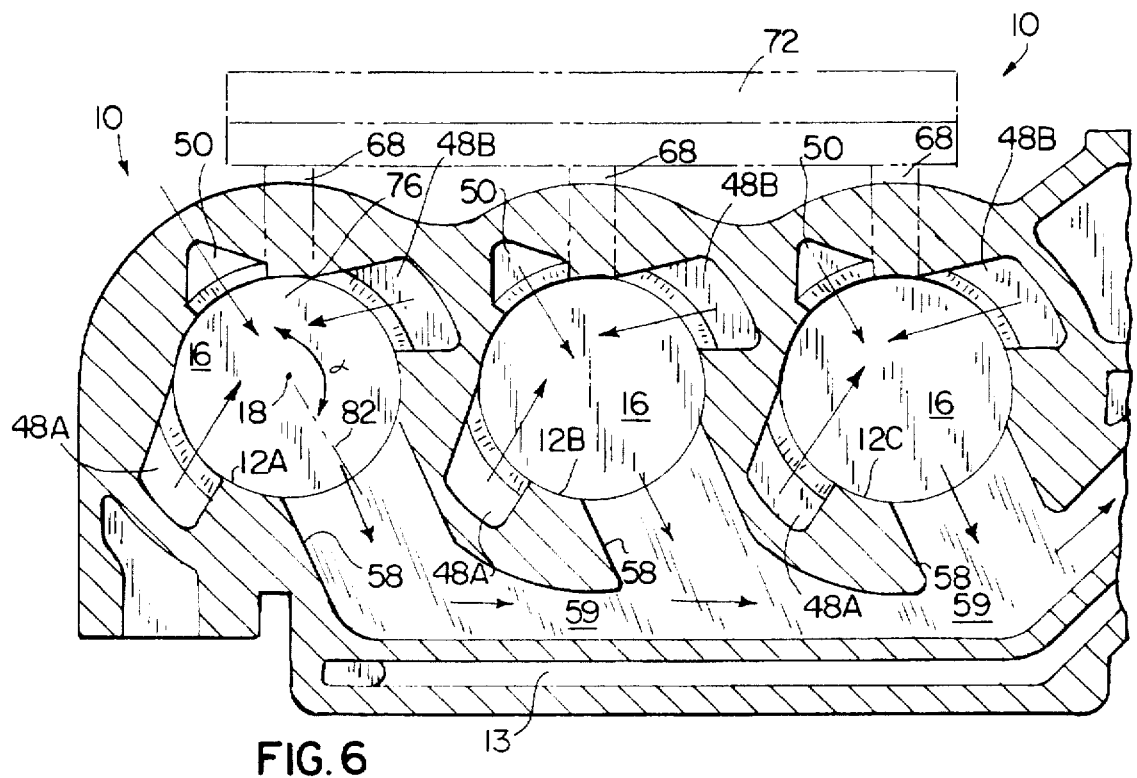
FIG. 6 is a schematic drawing illustrating air flows and fuel injection into the three-cylinder loop-scavenged, two-cycle internal combustion engine shown in FIG. 5.

FIGS. 5–7 illustrate the low-pressure, cylinder wall fuel injection system described in conjunction with FIGS. 1–4 being implemented in a multi-cylinder engine 10. FIGS. 5–7 show a three-cylinder engine block 14 having three parallel cylinders 12a, 12b and 12c. The cylinders 12a, 12b and 12c along with the associated transfer ports 48A and 48B, boost ports 50, and exhaust ports 58 are nested in engine block 14 to provide for a compact engine block design. FIG. 6 shows the exhaust ports 58 leading into an exhaust manifold 59.

Each of the fuel injectors 68 has a portion extending outward from the engine block 14. On this portion, each fuel injector 68 has an inlet stem 86. The top end 80 of the inlet stem 86 of each fuel injector 68 is coplanar with the top ends 80 of the other fuel injectors 68. The openings 70 in the engine block 14 are configured so that the spray axis of the fuel injectors 68 are parallel to the spray axes of the other fuel injectors 68. Each fuel injector 68 is mounted through the cylinder wall at an angle $\alpha$ that is equal to about 150° around the combustion cylinder wall from a centerline 82 of the exhaust port 58. Because of $\alpha$ equalling about 150°, it would be unlikely that a substantial portion of fuel spray from the fuel injectors 68 would actually short circuit directly through the exhaust port 58 even absent converging air flows from transfer ports 48A and 48B for convecting vaporized fuel away from the exhaust port 58.

The fuel rail 72 is straight. The fuel rail 72 has a common straight fuel canal 73 for each of the three fuel injectors 68, along with separate dedicated canals 84 for each fuel injector 68. The dedicated canals 84 are perpendicular to the common straight canal 73. The straight fuel rail 72 is mounted over the coplanar top ends 80 of the fuel injectors 68 so that the inlet stem 86 of each fuel injector 68 is received within the corresponding canal 84 in the fuel rail 72. O-ring seals 85 seal the interface between the inlet stem 86 of the fuel injector 68 and the corresponding dedicated canal 84 in the fuel rail 72. Fuel pressurized at a relatively low-pressure, e.g. 40 to 100 psi, is supplied to the fuel injectors 68 through common fuel canal 73 in the straight fuel rail 72. FIG. 7 shows a fitting 88 being used to attach a fuel line 90 to the fuel rail 72. O-ring seals 87 seal the interface between the fitting 88 and the common straight canal 73. The fuel rail 72 and the fuel injectors 68 are mounted to the engine block 14 by securing attachment bolts 92 through the fuel rail 72 and into mounting bosses 94 on the engine block 14. FIG. 7 shows a plug 96 and O-ring 97 sealing the common canal 73 in the fuel rail 72 on the side of the fuel rail 72 opposite the fuel line 90. A plugged fuel rail can be used if the fuel pumping system is capable of continuously providing fuel at the desired pressure without requiring a continuous flow of fuel through the fuel rail 72.

Figure 8:
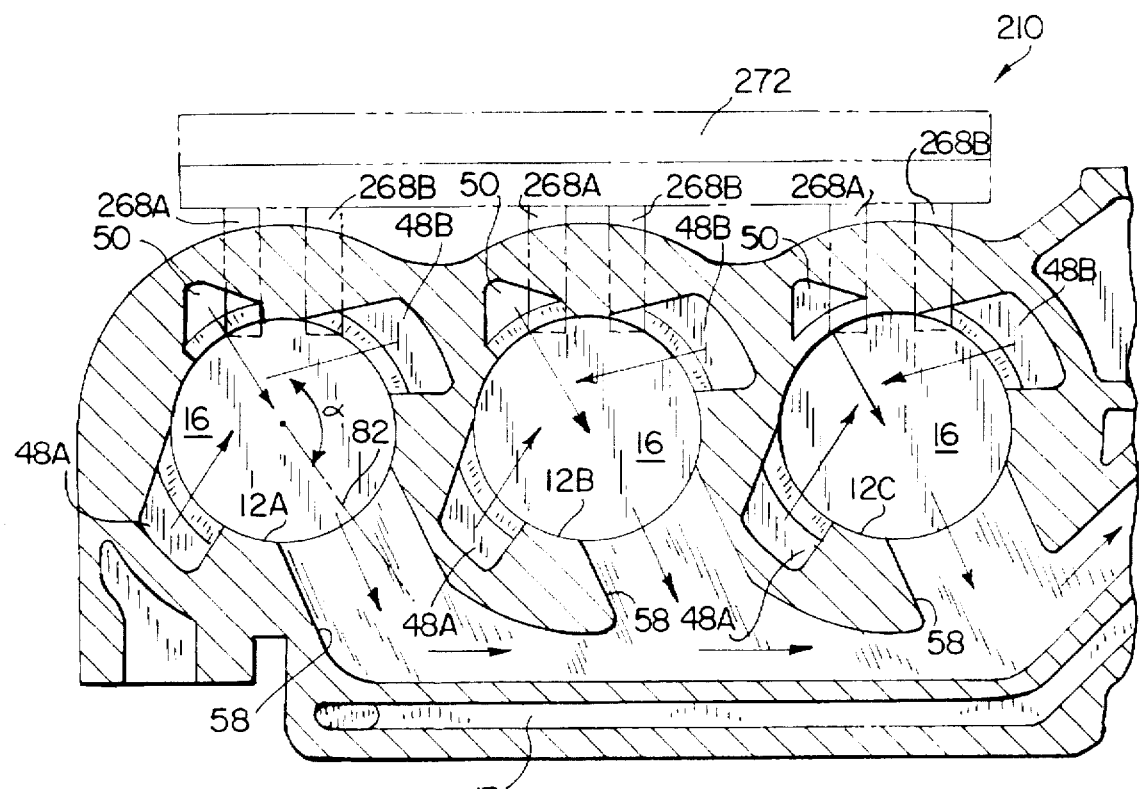
FIG. 8 is a schematic drawing similar to FIG. 6 illustrating air flows and fuel injections in a three-cylinder loop scavenged, two-cycle internal combustion engine in which two fuel injectors inject fuel into each cylinder.
Figure 9:
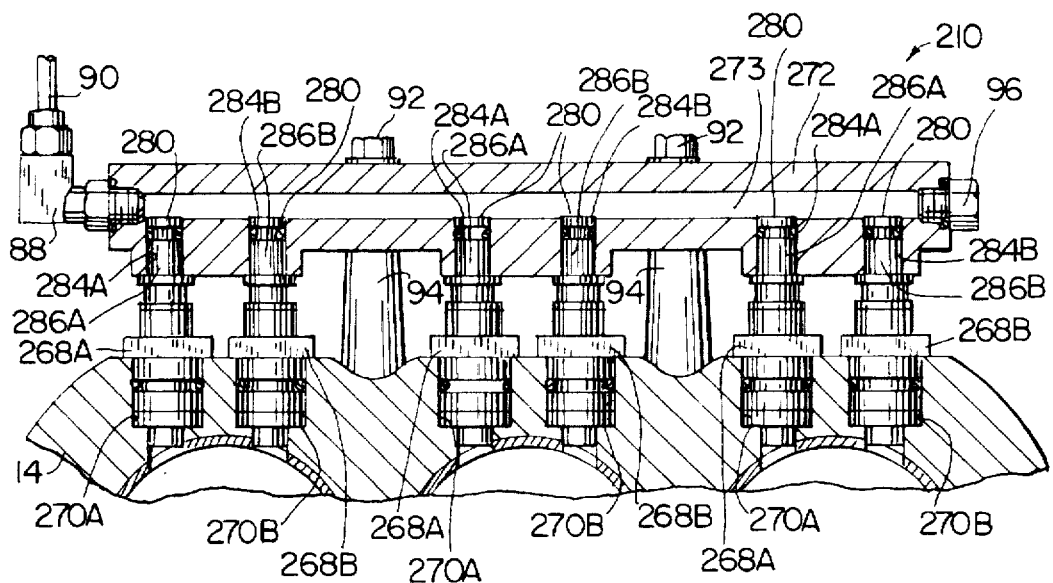
FIG. 9 is a view similar to FIG. 7 illustrating a three-cylinder loop scavenged, two-cycle internal combustion engine having two fuel injectors injecting fuel into each cylinder as is in accordance with the invention.
Figure 10:
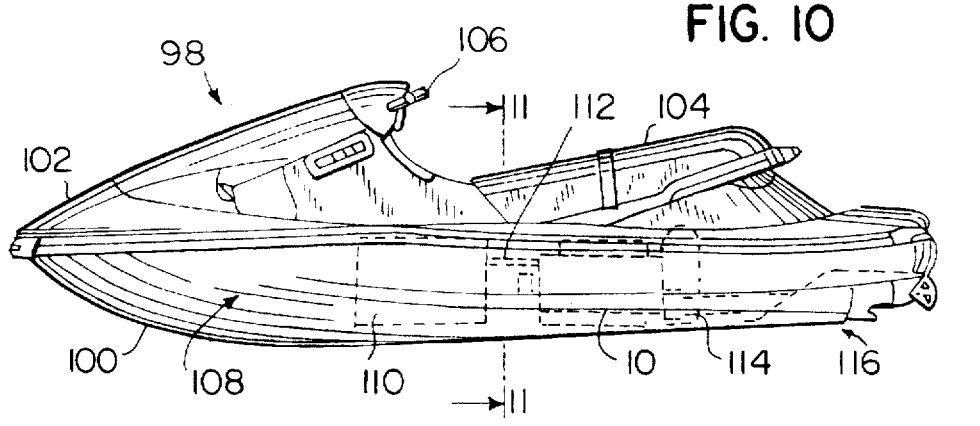
FIG. 10 is a side view of a personal watercraft having a three-cylinder, loop-scavenged two-cycle internal combustion engine with a low-pressure fuel supply system and cylinder wall fuel injection as in accordance with the invention.

FIGS. 8 and 9 illustrate a low-pressure, cylinder wall fuel injection system similar to that shown in FIGS. 5–7, except the system 210 in FIGS. 8 and 9 uses two fuel injectors 268A, 268B to inject fuel into the piston cavity 16 of each cylinder 12A, 12B and 12C. It may be desirable to use two fuel injectors 268A, 268B for each cylinder 12A, 12B and 12C when it is desired to inject more fuel into the cylinder 12A, 12B and 12C than can be provided by only one fuel injector. As described in conjunction with FIGS. 5 and 7, the cylinders 12A, 12B and 12C, along with the associated transfer ports 48A and 48B, boost ports 50, and exhaust ports 58 are nested in engine block 14 to provide for a compact engine block design. Each of the fuel injectors 268A and 268B have a portion extending outward from the engine block 14. On this portion, each fuel injector 268A, 268B has an inlet stem 286A, 286B. The opening 70 in the engine block 14 are configured so that the spray axis of each of the injectors 268A and 268B are parallel to the spray axes of the other fuel injectors 268A and 268B. Each fuel injector 268A, 268B is mounted through the cylinder wall at an angle α that is equal to about 150° around the combustion cylinder wall from a centerline 82 of the exhaust port 58. It is preferred that both of the fuel injectors 268A and 268B are oriented to spray into the zone of convergence 60. FIG. 2.

The fuel rail 272 is straight. The fuel rail 272 has a common straight fuel canal 273 for each of the six fuel injectors 268A, 268B, along with a separate dedicated canal 284A, 284B for each fuel injector 268A, 268B. The dedicated canals 284A, 284B are perpendicular to the common straight canal 273. The straight fuel rail 272 is mounted over the coplanar top ends 280 of the fuel injectors 268A, 268B so that the inlet stem 286A, 286B of each fuel injector 268A, 268B is received within the corresponding canal 284A, 284B in the fuel rail 272. O-rings seal the interface between the inlet stem 286A, 286B of the fuel injectors 268A, 268B and the corresponding dedicated canal 284A, 284B in the fuel rail 272. Fuel pressurized at a relatively low pressure, e.g. 40 to 100 psi, is supplied to the fuel injectors 268A, 268B through common fuel canal 273 in the straight fuel rail 272. In all other respects, the system 210 shown in FIGS. 8 and 9 is similar to the system 10 shown in FIGS. 5–7.

FIGS. 10–13 illustrate the use of the three-cylinder, two-stroke, loop-scavenged engine having cylinder wall fuel injection in accordance with the invention being implemented in a personal watercraft 98. The personal watercraft 98 shown in FIG. 10 has a hull 100 and a deck 102, both preferably made of fiber reinforced plastic. A driver and/or passenger riding the watercraft 98 straddles the seat 104. The driver steers the watercraft 98 using a steering assembly 106 located forward of the seat 104. An engine compartment 108 is located between the hull 100 and the deck 102. An engine 10 in accordance with the invention is located within the engine compartment 108. A fuel tank 110 is located in the engine compartment 108 forward of the engine 10. The engine 10 receives fuel from the fuel tank 110 through a pressurized fuel line 112 (e.g. fuel pressurized at 40 to 100 psi). The engine 10 has a horizontal output shaft 114 that is coupled to a jet pump located rearward of the engine 10 generally in the vicinity shown by arrow 116. The jet pump 116 propels the watercraft 98.

Figure 11:
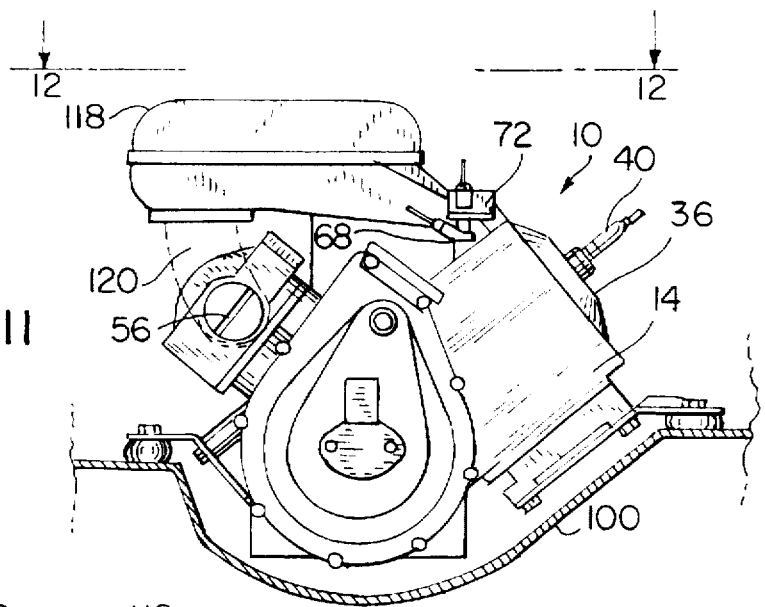
FIG. 11 is a view taken along line 11—11 in FIG. 10.
Figure 12:
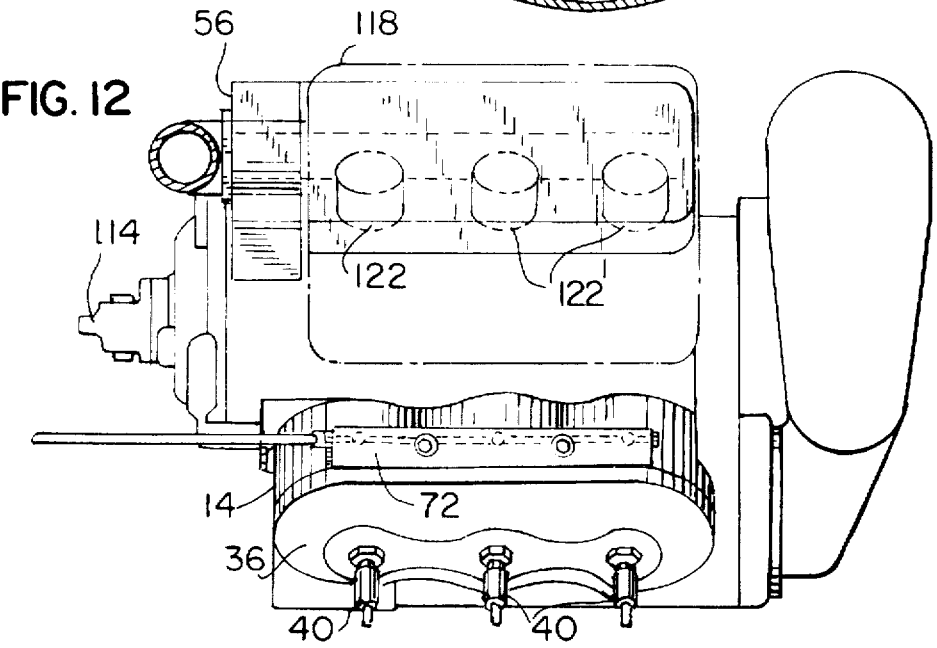
FIG. 12 is a view taken along line 12—12 in FIG. 11.

FIGS. 11 and 12 show the three-cylinder engine 10 as preferably mounted to the hull 100 of the watercraft 98 so that the longitudinal cylinder axes 18 are tilted at approximately a 50° angle with respect to a vertical plane. With this configuration, the fuel injectors 68 and the straight fuel rail 72 are accessible from the top side of the engine 10. This facilitates assembly and disassembly for service and maintenance of the cylinder wall fuel injection system. An air intake plenum 118 for the engine 10 has a single inlet 120 and three outlets 122. The air intake plenum 118 has an outlet 122 for each combustion cylinder. A throttle body 56 regulates the amount of air flowing through the inlet 120 into the air intake plenum 118.

Figure 13:
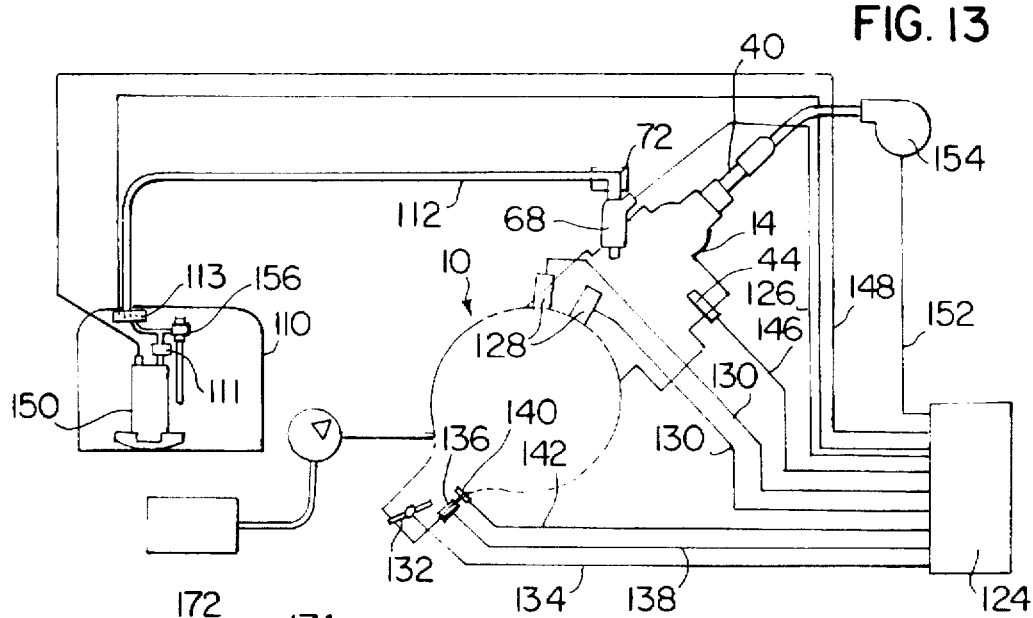
FIG. 13 is a schematic diagram illustrating a low-pressure fuel supply system and cylinder wall fuel injection system for the personal watercraft engine depicted in FIGS. 10 through 12.

FIG. 13 schematically illustrates an electronic control unit 124 controlling the operation of the engine 10 in the personal watercraft 98. The electronic control unit 124 transmits a control signal through line 126 to fuel injector 68 to control fuel injection timing of the fuel injectors 68. The electronic control unit 124 contains a matrix of fuel requirements, spark advance (firing timing), and injection timing that depend primarily on throttle opening and engine speed but can be modified depending upon ambient conditions as well as other factors. Engine speed is preferably measured using crankshaft position sensors 128 which transmit signals through lines 130 to the electronic control unit 124. The electronic control unit 124 can determine engine rpm from the signals from the crankshaft position sensors 128. The throttle position is monitored using a throttle position sensor 132 which transmits a signal through line 134 to the electronic control unit 124. A manifold air pressure sensor 136 measures the air pressure in the intake manifold and transmits a signal through line 138 to electronic control unit 124. A temperature sensor 140 senses the temperature of intake air in the manifold and transmits a signal through line 142 to the electronic control unit 124. Another temperature sensor 144 senses the temperature of engine coolant flowing through the engine block 14 and transmits a signal through line 146 to the electronic control unit 124. In response to signals inputting the electronic control unit 124 through lines 130, 134, 138, 142, and 146 the electronic control unit 124 transmits a signal in line 126 to control the operation of the fuel injectors 68, as well as control signals through line 148 to control the operation of a fuel pump 150, and line 152 to control the timing of ignition coil 154 which provides energy to fire spark plug 40.

It is preferred that the electronic control unit 124 control the fuel pump 150 located in the fuel tank 110 so that the fuel pump 150 operates only when the engine is running. The fuel pump 150 pumps fuel into pressurized fuel line 112 leading to the fuel rail 72, preferably between 40 and 100 psi, although lower fuel pressure such as 40 to 60 psi may be desirable to reduce pump 150 heat generation. A fuel filter 111 is located in pressurized fuel line 112 immediately upstream of the fuel pump 150. A pressure regulator 156 communicates with the pressurized fuel line 112 to regulate the pressure in the pressurized fuel line 112. The pressure regulator 156 is also located in the fuel tank 110 so that excessive fuel remains in the fuel tank 110. The fuel pump 150 is preferably a continuous duty pump, but it should not be necessary to cool the fuel/pump because fuel in the fuel tank 110 should be sufficient to eliminate the need for auxiliary cooling. A fuel pressure sensor or switch 113 is located within the pressurized fuel line 112 downstream of the location where the pressure regulator 156 communicates with the pressurized fuel line 112. The electronic control unit 124 monitors the pressure sensor 113. The purpose of the pressure sensor 113 is to detect reduced pressure in line 112, so that the electronic control unit 124 can limit spark advance in case there is insufficient fuel pressure thus preventing engine failure. It is preferred that the electronic control unit 124 allow the fuel pressure in line 112 at pressure sensor 113 to be at least 5 psi below the preferred fuel pressure in line 112 before limiting spark advance. By limiting spark advance, the engine will not fail, and the operator will be able to return home at a low speed.

Figure 14:
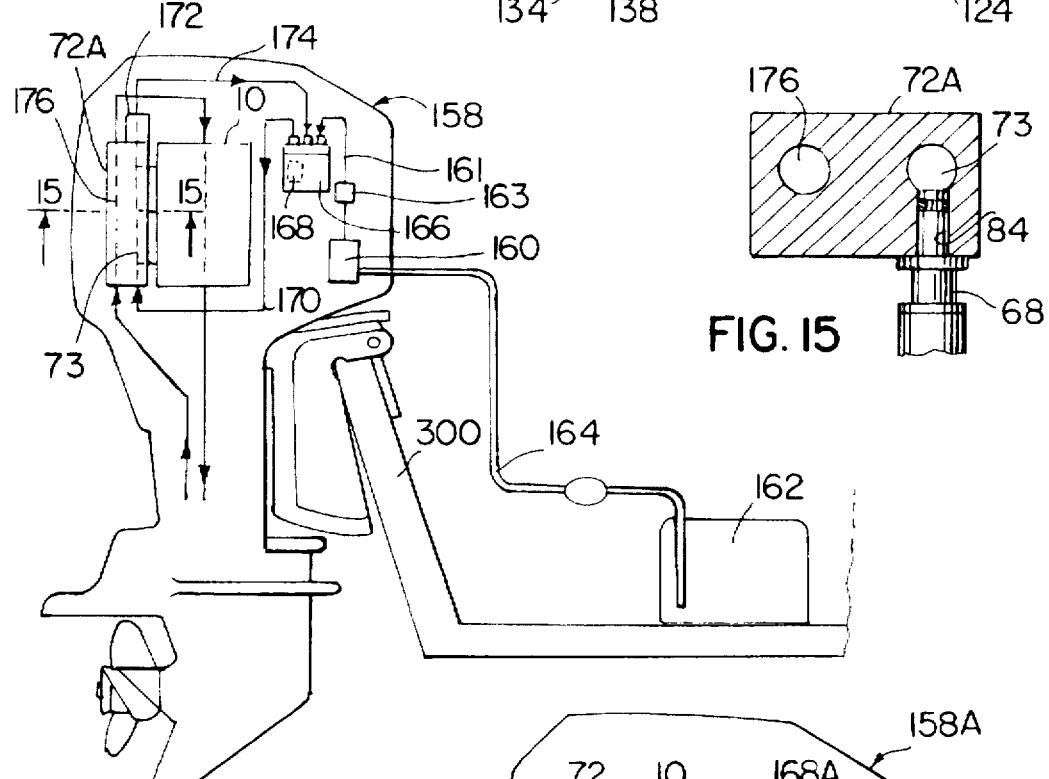
FIG. 14 is a schematic view in accordance with the invention illustrating a low-pressure fuel supply system for an outboard motor utilizing a continuous duty pump in which a fuel rail is cooled.
Figure 15:
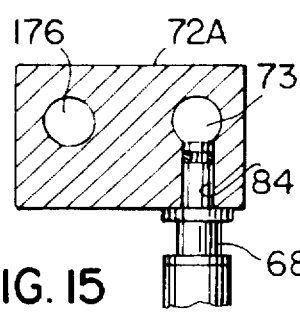
FIG. 15 is a view taken along line 15—15 in FIG. 14.

FIGS. 14 and 15 schematically illustrate use of the engine 10 described in FIGS. 1–9 in an outboard motor 158. FIG. 14 shows an outboard motor 158 mounted to the transom 300 of a boat. The engine 10 in FIG. 14 has a vertical output shaft and horizontal cylinders. A fuel tank 162 is located within the boat, and an unpressurized fuel line 164 is removably connected to the outboard motor 158 as is well known in the art. Fuel from the fuel tank 162 is sucked into the outboard motor 158 through the unpressurized fuel line 164 by a first pump 160. The first pump 160 is preferably a mechanical diaphragm pump which is driven by oscillating pressures in the crankcase of the engine 10 as is known in the art. The first fuel pump 160 pumps fuel through line 161 at a relatively low pressure to a fuel reservoir 166. A fuel filter 163 is located in fuel line 161. A second fuel pump 168 is located in the fuel reservoir 166 and provides pressurized fuel (e.g., 40 to 100 psi) through pressurized fuel line 170 to fuel rail 72A. In FIG. 14, the second fuel pump 168 is a continuous duty pump. The fuel rail 72A includes common fuel supply canal 73 and separate dedicated canals 84 for each of the fuel injectors 68 as described earlier in connection with FIGS. 7 and 9. A pressure regulator 172 is provided in series with the fuel supply canal 73 downstream of the fuel injectors 68 to regulate the pressure within the fuel supply canal 73 in the fuel rail 72A, preferably between 40 to 100 psi. Excessive fuel from the pressure regulator 172 returns to the fuel reservoir 166 via return line 174. The preferred fuel reservoir 166 and second fuel pump 168 is disclosed in U.S. Pat. No. 5,103,793, entitled "Vapor Separator For An Internal Combustion Engine", by Steven B. Riese and James Hubbel, issued on Apr. 14, 1992 and assigned to the assignee of the present application, which is incorporated by reference herein.

Inasmuch as the second fuel pump 168 is a continuous duty pump, it may be desirable to cool the pump 168 to reduce fuel pumping problems. A suitable way of cooling the second fuel pump 168 is to provide a housing around the body of the pump 168, and flow cooling media, such as cooling water, around the body of the pump 168 through the housing.

Alternatively, it may be desirable to cool the fuel flowing through the fuel rail 72A to reduce fuel pumping problems. Fuel rail 72A thus includes a cooling duct 176 that provides a path for cooling media, such as cooling water, to flow through the fuel rail 72A to cool the fuel flowing through the fuel rail 72A. As shown in FIG. 14, cooling water exiting the fuel rail 72A can then be used to cool the engine 10, although this is not necessary.

Figure 16:
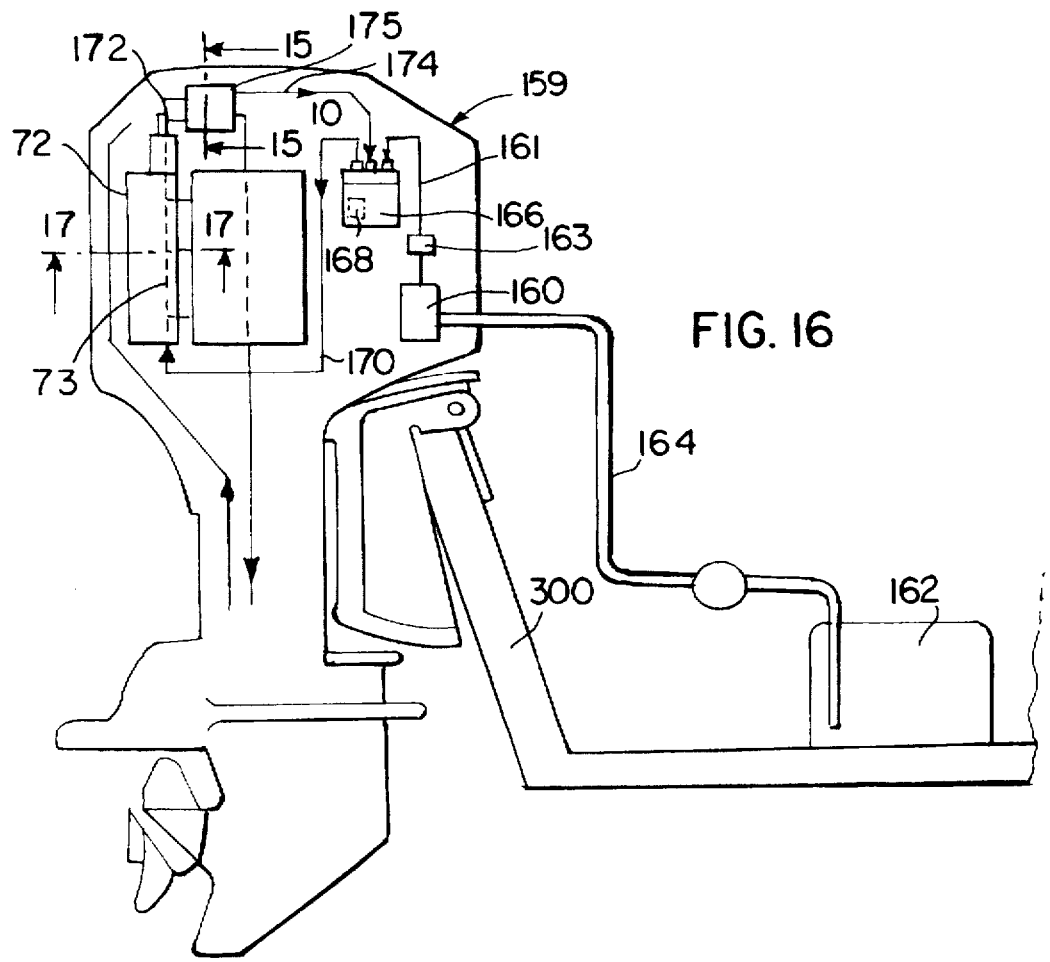
FIG. 16 is a schematic view in accordance with the invention of a low-pressure fuel supply system for an outboard motor utilizing a continuous duty pump in which an in-line fuel cooler is placed in a fuel return line.
Figure 17:
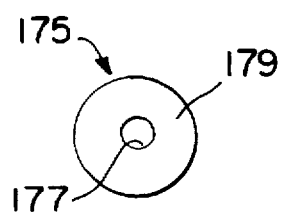
FIG. 17 is a view taken along line 17—17 in FIG. 16.

FIGS. 16 and 17 show a fuel supply system for an outboard motor 159 which is similar in many respects to the system 158 shown in FIGS. 14 and 15, except an in-line fuel cooler 175 is located in fuel return line 174 between pressure regulator 172 and the fuel reservoir 166 to cool the fuel rather than providing a cooling duct in the fuel rail 72. In other respects, the system shown in FIG. 16 is similar to the system shown in FIG. 14 and like reference numerals are used to facilitate understanding. The in-line fuel cooler 175 is preferably a tube-in-tube heat exchanger having an inner tube 177 and an outer tube 179. It is preferred that cooling water flow through the inner tube 177, and fuel flow between the inner tube 177 and the outer tube 179.

Figure 18:
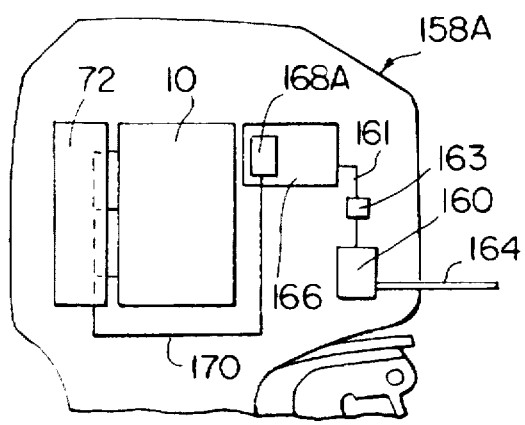
FIG. 18 is schematic view in accordance with the invention illustrating a low-pressure fuel supply system for an outboard motor having a pulse width modulated fuel pump.

FIG. 18 illustrates an outboard motor 158*a* in which the second fuel pump 168*a* located in the fuel reservoir 166 is not a continuous duty pump. In FIG. 18, an electronic control unit preferably controls the operation of the second pump 168*a* and fuel reservoir 166 via pulse width modulation so that the second pump 168*a* operates intermittently when the engine is running at low and medium loads to maintain suitable pressure in line 170 and the fuel rail 72 for the fuel injectors 68. The system shown in FIG. 18 does not require a pressure regulator downstream of the fuel rail 72, a return line from the fuel rail 72 to the fuel reservoir 166, nor means for cooling the fuel.

Various modifications, alternatives and equivalents of the invention may be apparent to those skilled in the art. Such modifications, alternatives and equivalents should be considered to come within the scope of the following claims.

We claim:

1. A loop-scavenged, two-cycle internal combustion engine comprising:

a cylinder block having at least one combustion cylinder which defines a piston cavity of cylindrical shape around a longitudinal cylinder axis;

a piston that reciprocates longitudinally through the piston cavity along the cylinder axis;

a cylinder head connected to the cylinder block to define a combustion chamber that is in communication with the piston cavity;

a spark plug mounted through the cylinder head so that a spark plug ignition electrode is exposed to the combustion chamber;

a crankcase connected to the cylinder block to define a charging chamber that is in communication with the piston cavity on the side of the piston opposite the combustion chamber;

an exhaust port passing through a wall of the combustion cylinder on a first side of the cylinder axis;

a first and second transfer port passing from the charging chamber into the portion of the piston cavity communicating with the combustion chamber, the first and second transfer ports passing through the combustion cylinder wall and being directed so that air flow through the transfer ports converges within a zone of convergence that is centered on the side of the longitudinal cylinder axis opposite the exhaust port;

a fuel injector passing through the wall of the combustion cylinder having a spray axis wherein all of the fuel injected into the piston cavity by the fuel injector is sprayed from the fuel injector into the piston cavity generally in the direction of the spray axis, and the spray axis is directed away from the spark plug ignition electrode and at the position underneath the zone of convergence so that at least some of the fuel sprayed from the fuel injector impinges on a crown of the piston in liquid form and become vaporized; and an electronic control unit that controls the operation of the fuel injector.

2. The engine recited in claim 1 wherein the first and second transfer ports are symmetrically located across the combustion chamber through the combustion cylinder wall.

3. The engine recited in claim 1 wherein the fuel injector spray axis is directed at an angle greater than 40° with respect to a plane normal to the longitudinal cylinder axis.

4. The engine recited in claim 1 wherein the longitudinal cylinder axis and the fuel injector spray axis intersect at a location on the side of the piston crown towards the charging chamber when the piston is at bottom dead center so that the fuel injector spray axis intersects the piston crown on the side of the longitudinal cylinder axis opposite the exhaust port.

5. The engine recited in claim 1 further comprising a boost port from the charging chamber passing into the combustion chamber through the cylinder wall, the boost port into the combustion chamber being symmetrically located between the transfer ports on the side of the cylinder axis opposite the exhaust port and also being directed at an angle towards the end of the combustion chamber to which the spark plug ignition electrode is exposed.

6. The engine recited in claim 1 wherein the fuel injector is mounted through the cylinder wall so that the spray axis of the fuel injector is located about 150° around the cylinder wall from a centerline of the exhaust port.

7. The engine recited in claim 1 further comprising:

a throttle body;

an air intake plenum; and a one-way valve;

wherein fresh air is supplied to the charging chamber through the throttle body, the air intake plenum, and the one-way valve.

8. The engine recited in claim 1 wherein the electronic control unit controls operation of the fuel injector so that fuel is completely dispensed from the fuel injector before the piston covers the exhaust port.

9. The engine recited in claim 1 wherein the pressure of the fuel supplied to the fuel injector is between 40 and 100 psi.

10. The engine recited in claim 1 further comprising a second fuel injector passing through the wall of the combustion cylinder having a spray axis directed at the piston underneath the zone of convergence, and having a spray axis that is parallel to the spray axis of the first fuel injector.

11. A loop-scavenged, two-stroke internal combustion engine having multiple cylinders comprising:

a cylinder block having a plurality of combustion cylinders which each define a piston cavity of cylindrical shape around a longitudinal cylinder axis, and each longitudinal cylinder axis is parallel to the other longitudinal cylinder axes;

a cylinder head connected to the cylinder block to define a separate combustion chamber for each piston cavity;

a spark plug for each piston cavity mounted through the cylinder head so that an ignition electrode for the spark plug is exposed to the combustion chamber in communication with the piston cavity;

a crankcase connected to the cylinder block to define a charging chamber for each piston cavity on the side of the piston opposite the combustion chamber for each piston;

an exhaust port for each piston cavity passing through a wall of the combustion cylinder;

a transfer port for each piston cavity passing from the charging chamber into the portion of the piston cavity communicating with the combustion cylinder;

a fuel injector for each piston cavity passing through the wall of the combustion cylinder and having a spray axis that is parallel to the spray axes of the fuel injectors for the other piston cavities, each fuel injector having a top end that is coplanar with the top ends of the other fuel injectors;

a straight fuel rail that provides pressurized fuel to each of the plurality of fuel injectors, wherein the fuel rail is secured to the cylinder block with the fuel injectors disposed therebetween; and an electronic control unit that controls the operation of the fuel injectors.

12. The engine recited in claim 11 further comprising:

an air intake plenum having a single inlet and a separate outlet for each charging chamber;

a throttle body that modulates the amount of fresh air flowing into the air intake plenum; and one-way valve means for preventing air from backflowing through the air intake plenum.

13. The engine recited in claim 11 wherein each of the fuel injectors are top fed fuel injectors and the straight fuel rail includes a common straight canal and separate dedicated canals for each fuel injector that are perpendicular to the common straight canal.

14. The engine recited in 11 wherein each fuel injector is mounted through the cylinder wall at about 150° around the combustion wall cylinder from a centerline of the exhaust port.

15. The engine recited in claim 11 wherein each fuel injector is positioned so that the spray axis is directed at an angle of greater than 40° with respect to a plane normal to the longitudinal cylinder axis.

16. The engine recited in claim 11 wherein the pressure within the fuel rail is between 40 to 100 psi.

17. The engine recited in claim 11 wherein the electronic control unit controls operation of the fuel injector so that fuel is completely dispensed from the fuel injectors before the piston covers the exhaust port.

18. The engine recited in claim 11 further comprising:

a second fuel injector for each piston cavity passing through the wall of the combustion cylinder and having a spray axis that is parallel to the spray axis of the first fuel injector for the piston cavity and also parallel to the spray axes of the fuel injectors for the other piston cavities, all of the fuel injectors having a top end that is coplanar with the top ends of the other fuel injectors; and a straight rail that provides pressurized fuel to each of the plurality of fuel injectors.

19. The engine recited in claim 18 wherein each of the fuel injectors are top fed fuel injectors and the straight fuel rail includes a common straight canal and separate dedicated canals for each fuel injector that are perpendicular to the common straight canal.

20. The engine recited in claim 18 wherein each fuel injector is mounted through the cylinder wall so that the spray axis of the fuel injector intersects a radial plane passing through the center of the exhaust port at a horizontal angle of about 150°.

21. The engine recited in claim 18 wherein each fuel injector is positioned so that the spray axis is directed at an angle of greater than 40° with respect to a plane normal to the longitudinal cylinder axis.

22. The engine recited in claim 18 wherein the pressure within the fuel rail is between 40 to 100 psi.

23. A watercraft comprising:

a hull and a deck defining an engine compartment therebetween;

a loop-scavenged, two-stroke internal combustion engine located within the engine compartment, the engine including a cylinder block having a plurality of combustion cylinders which each define a piston cavity having a substantially cylindrical shape around a longitudinal cylinder axis and each longitudinal cylinder axis is parallel to the other longitudinal cylinder axes, a piston for each cylinder that reciprocates longitudinally through the piston cavity along the longitudinal cylinder axis, a cylinder head connected to the cylinder block to define a combustion chamber for each piston cavity, a spark plug for each piston cavity mounted through the cylinder head so that a spark plug ignition electrode is exposed in each combustion chamber, a crankcase connected to the cylinder block to define a charging chamber for each piston cavity on the side of the piston opposite the combustion chamber, an exhaust port for each combustion cylinder, at least one transfer port for each piston cavity passing from the charging chamber into the portion of the piston cavity communicating with the combustion chamber, a fuel injector for each combustion cylinder which is mounted in an opening that passes through the cylinder block and through the wall of the combustion cylinder into the piston cavity;

a fuel tank located within the engine compartment of the watercraft;

a fuel pump located within the fuel tank;

a pressurized fuel line for flowing pressurized fuel from the fuel pump in the fuel tank to the internal combustion engine;

a pressure regulator communicating with the pressurized fuel line to regulate the pressure in the pressurized fuel line;

a fuel rail that receives fuel from the pressurized fuel line and supplies pressurized fuel to each of the fuel injectors;

an electronic control unit that controls the operation of the fuel injectors and also controls the operation of the fuel pump; and a pressure sensor that senses the fuel pressure in the pressurized fuel line at a location downstream of the location where the pressure regulator communicates with the pressurized fuel line;

wherein the electronic control unit receives a signal from the pressure sensor to monitor fuel pressure in the pressurized fuel line.

24. The watercraft recited in claim 23 wherein the electronic control unit will limit spark advance of the engine when the pressure sensor outputs a signal indicating that fuel pressure in the pressurized fuel line is at least 5 psi below normal operating fuel pressure.

25. The watercraft recited in claim 23 further comprising:

an air intake plenum having a single inlet and an outlet for each combustion cylinder;

a throttle body for regulating the amount of air flowing into the air intake plenum; and a one-way valve that prevents air from backflowing through the throttle body.

26. The watercraft recited in claim 25 further comprising an air temperature sensor that measures the temperature of the intake air in the air intake plenum and transmits an air temperature signal to the electronic control unit.

27. The watercraft recited in claim 23 further comprising:

one or more engine load sensors which generate a signal that is transmitted to the electronic control unit.

28. The watercraft recited in claim 27 wherein at least one of the engine load sensors is a manifold air pressure sensor.

29. The watercraft recited in claim 27 wherein at least one of the engine load sensors is a throttle position sensor.

30. The watercraft recited in claim 23 further comprising an engine temperature sensor which measures the temperature of coolant flowing through the cylinder block and transmits an engine temperature signal to the electronic control unit.

31. A watercraft comprising:

a hull and a deck defining an engine compartment therebetween;

a loop-scavenged, two-stroke internal combustion engine located within the engine compartment, the engine including a cylinder block having a plurality of combustion cylinders which each define a piston cavity having a substantially cylindrical shape around a longitudinal cylinder axis and each longitudinal cylinder axis is parallel to the other longitudinal cylinder axes, a piston for each cylinder that reciprocates longitudinally through the piston cavity along the longitudinal cylinder axis, a cylinder head connected to the cylinder block to define a combustion chamber for each piston cavity, a spark plug for each piston cavity mounted through the cylinder head so that a spark plug ignition electrode is exposed in each combustion chamber, a crankcase connected to the cylinder block to define a charging chamber for each piston cavity on the side of the piston opposite the combustion chamber.

an exhaust port for each combustion cylinder, at least one transfer port for each piston cavity passing from the charging chamber into the portion of the piston cavity communicating with the combustion chamber, a fuel injector for each combustion cylinder which is mounted in an opening that passes through the cylinder block and through the wall of the combustion cylinder into the piston cavity;

a fuel tank located within the engine compartment of the watercraft;

a fuel pump located within the fuel tank;

a pressurized fuel line for flowing pressurized fuel from the fuel pump in the fuel tank to the internal combustion engine;

a pressure regulator communicating with the pressurized fuel line to regulate the pressure in the pressurized fuel line;

a fuel rail that receives fuel from the pressurized fuel line and supplies pressurized fuel to each of the fuel injectors;

an electronic control unit that controls the operation of the fuel injectors and also controls the operation of the fuel pump; and wherein the engine has a crankshaft that is positioned horizontally and the combustion cylinder is tilted at about 50° with respect to a vertical plane.

32. The watercraft recited in claim 31 wherein the fuel pump is a continuous duty fuel pump.

33. A watercraft comprising:

a hull and a deck defining an engine compartment therebetween;

a loop-scavenged, two-stroke internal combustion engine located within the engine compartment, the engine including a cylinder block having a plurality of combustion cylinders which each define a piston cavity having a substantially cylindrical shape around a longitudinal cylinder axis and each longitudinal cylinder axis is parallel to the other longitudinal cylinder axes, a piston for each cylinder that reciprocates longitudinally through the piston cavity along the longitudinal cylinder axis, a cylinder head connected to the cylinder block to define a combustion chamber for each piston cavity, a spark plug for each piston cavity mounted through the cylinder head so that a spark plug ignition electrode is exposed in each combustion chamber, a crankcase connected to the cylinder block to define a charging chamber for each piston cavity on the side of the piston opposite the combustion chamber.

an exhaust port for each combustion cylinder, at least one transfer port for each piston cavity passing from the charging chamber into the portion of the piston cavity communicating with the combustion chamber, a fuel injector for each combustion cylinder which is mounted in an opening that passes through the cylinder block and through the wall of the combustion cylinder into the piston cavity;

a fuel tank located within the engine compartment of the watercraft;

a fuel pump located within the fuel tank;

a pressurized fuel line for flowing pressurized fuel from the fuel pump in the fuel tank to the internal combustion engine;

a pressure regulator communicating with the pressurized fuel line to regulate the pressure in the pressurized fuel line;

a fuel rail that receives fuel from the pressurized fuel line and supplies pressurized fuel to each of the fuel injectors;

an electronic control unit that controls the operation of the fuel injectors and also controls the operation of the fuel pump; and the engine has a crankshaft that is positioned horizontally and wherein the engine includes a second fuel injector for each combustion cylinder which is mounted in a second opening that passes through the cylinder block and through the wall of the combustion cylinder into the piston cavity.

34. In a marine propulsion system having an outboard motor adapted to be mounted on a transom of a boat, a fuel tank located within the boat, and an unpressurized fuel line from the fuel tank to the outboard motor, an improved outboard motor comprising:

a loop-scavenged, two-cycle internal combustion engine including a cylinder block having a plurality of combustion cylinders which each define a piston cavity of substantially cylindrical shape around a longitudinal cylinder axis and each longitudinal cylinder axis is parallel to the longitudinal cylinder axes of the other piston cavities, a cylinder head connected to the cylinder block to define a separate combustion for each piston cavity, a spark plug mounted through each cylinder head so that a spark plug ignition electrode is exposed to each combustion chamber, a piston for each cylinder that reciprocates longitudinally through the piston cavity along the longitudinal cylinder axis, a crankcase connected to the cylinder block to define a charging chamber for each piston cavity on the side of the piston opposite the combustion chamber for the piston cavity, an exhaust port from each combustion chamber, and at least one transfer port passing from the charging chamber for each cylinder into the portion of the piston cavity communicating with the combustion chamber;

a fuel injector for each piston cavity which is mounted in an opening that passes through the cylinder block and through the cylinder wall of the combustion cylinder into the piston cavity so that the spray axis of each fuel injector is directed at an angle of greater than 40° with respect to a plane normal to the longitudinal cylinder axis;

a first fuel pump removably connected to the unpressurized fuel line from the fuel tank in the boat;

a fuel reservoir within the outboard motor that receives fuel pumped by first fuel pump;

a second fuel pump located in the fuel reservoir for supplying pressurized fuel to the internal combustion engine;

a pressurized fuel line from the second fuel pump;

a fuel rail that receives fuel from the pressurized fuel line and supplies pressurized fuel to each of the fuel injectors; and an electronic control unit that controls the operation of the fuel injectors and also controls the pressure of the fuel in the pressurized fuel line and the fuel rail by controlling the operation of the second fuel pump via pulse width modulation;

wherein pressure in the pressurized fuel line is regulated by a pressure regulator communicating with the pressurized fuel line and located in the fuel reservoir in the outboard motor.

35. The outboard motor recited in claim 34 wherein the first fuel pump pumps fuel through a fuel filter before the fuel is received in the fuel reservoir.

36. The outboard motor recited in claim 34 wherein the engine further includes a second fuel injector for each piston cavity which is mounted in a second opening that passes through the cylinder block and through the cylinder wall of the combustion chamber into the piston cavity so that the spray axis of the second fuel injector is directed at an angle of greater than 40° with respect to a plane normal of the longitudinal cylinder axis.

37. In a marine propulsion system having an outboard motor adapted to be mounted on a transom of a boat, a fuel tank located within the boat, and an unpressurized fuel line from the fuel tank to the outboard motor, an improved outboard motor comprising:

a loop-scavenged, two-cycle internal combustion engine including a cylinder block having a plurality of combustion cylinders which each define a piston cavity of substantially cylindrical shape around a longitudinal cylinder axis and each longitudinal cylinder axis is parallel to the longitudinal cylinder axes of the other piston cavities, a cylinder head connected to the cylinder block to define a separate combustion for each piston cavity, a spark plug mounted through each cylinder head so that a spark plug ignition electrode is exposed to each combustion chamber, a piston for each cylinder that reciprocates longitudinally through the piston cavity along the longitudinal cylinder axis, a crankcase connected to the cylinder block to define a charging chamber for each piston cavity on the side of the piston opposite the combustion chamber for the piston cavity, an exhaust port from each combustion chamber, and at least one transfer port passing from the charging chamber for each cylinder into the portion of the piston cavity communicating with the combustion chamber;

a fuel injector for each piston cavity which is mounted in an opening that passes through the cylinder block and through the cylinder wall of the combustion cylinder into the piston cavity so that the spray axis of each fuel injector is directed at an angle of greater than 40° with respect to a plane normal to the longitudinal cylinder axis;

a first fuel pump removably connected to the unpressurized fuel line from the fuel tank in the boat;

a fuel reservoir within the outboard motor that receives fuel from the first fuel pump;

a second fuel pump located in the fuel reservoir for supplying pressurized fuel to the internal combustion engine, the second fuel pump being a continuous duty pump;

a pressurized fuel line from the second fuel pump to the fuel rail;

a fuel rail that receives fuel from the pressurized fuel line and supplies pressurized fuel to each of the fuel injectors;

a fuel return line that allows excessive fuel to return to the fuel reservoir;

means for cooling the excessive fuel before it returns to the fuel reservoir; and an electronic control unit that controls the operation of the fuel injectors;

wherein said means for cooling the excessive fuel before it returns to the fuel reservoir comprises an in-line fuel cooler that cools fuel flowing in the return line to the fuel reservoir.

38. The outboard motor recited in claim 37 further comprising a mechanical regulator that regulates pressure in the pressurized fuel line from the second fuel pump and in the fuel rail, and allows excessive fuel to flow to the fuel return line.

39. The outboard motor recited in claim 37 wherein the fuel reservoir is a vapor separation tank.

40. The outboard motor recited in claim 37 wherein said means for cooling the excessive fuel before it returns to the fuel reservoir comprises a cooling duct in the fuel rail which allows cooling media to flow through the fuel rail to cool the fuel flowing through the fuel rail.

41. The outboard motor recited in claim 40 wherein the in-line fuel cooler is a tube-in-tube heat exchanger in which cooling water flows through an inner tube and fuel flows between the inner tube and an outer tube.

42. The outboard motor recited in claim 37 wherein the first fuel pump pumps fuel through a fuel filter before the fuel is received in the fuel reservoir.

43. The outboard motor recited in claim 37 wherein the pressure of the pressurized fuel in the pressurized fuel line in the fuel rail is between 40 and 100 psi.

44. The outboard motor recited in claim 37 wherein the internal combustion engine further includes an air intake plenum having a single inlet and a separate outlet for each charging chamber, a throttle body for modulating the amount of air flowing into the air intake plenum, and one-way valve means for preventing air from backflowing through the throttle body.

45. The outboard motor recited in claim 37 wherein the engine further includes a second fuel injector for each piston cavity which is mounted in a second opening that passes through the cylinder block and through the cylinder wall of the combustion chamber into the piston cavity so that the spray axis of the second injector is also directed at an angle of greater than 40° with respect a plane normal to the longitudinal cylinder axis.

46. In a marine propulsion system having an outboard motor adapted to be mounted on a transom of a boat, a fuel tank located within the boat, and an unpressurized fuel line from the fuel tank to the outboard motor, an improved outboard motor comprising:

a loop-scavenged, two-cycle internal combustion engine including a cylinder block having a plurality of combustion cylinders which each define a piston cavity of substantially cylindrical shape around a longitudinal cylinder axis and each longitudinal cylinder axis is parallel to the longitudinal cylinder axes of the other piston cavities, a cylinder head connected to the cylinder block to define a separate combustion for each piston cavity, a spark plug mounted through each cylinder head so that a spark plug ignition electrode is exposed to each combustion chamber, a piston for each cylinder that reciprocates longitudinally through the piston cavity along the longitudinal cylinder axis, a crankcase connected to the cylinder block to define a charging chamber for each piston cavity on the side of the piston opposite the combustion chamber for the piston cavity, an exhaust port from each combustion chamber, and at least one transfer port passing from the charging chamber for each cylinder into the portion of the piston cavity communicating with the combustion chamber;

a first fuel injector for each piston cavity which is mounted in an opening that passes through the cylinder block and through the cylinder wall of the combustion cylinder into the piston cavity so that the spray axis of each fuel injector is directed at an angle of greater than 40° with respect to a plane normal to the longitudinal cylinder axis;

a second fuel injector for each piston cavity which is mounted in a second opening that passes through the cylinder block and through the cylinder wall of the combustion cylinder into the piston cavity so that the spray axis of the second fuel injector is also directed at an angle of greater than 40° with respect to a plane normal to the longitudinal cylinder axis;

a first fuel pump removably connected to the unpressurized fuel line from the fuel tank in the boat;

a fuel reservoir within the outboard motor that receives fuel from the first fuel pump;

a second fuel pump located in the fuel reservoir for supplying pressurized fuel to the internal combustion engine, the second fuel pump being a continuous duty pump;

a pressurized fuel line from the second fuel pump to the fuel rail;

a fuel rail that receives fuel from the pressurized fuel line and supplies pressurized fuel to each of the fuel injectors;

a fuel return line that allows excessive fuel to return to the fuel reservoir;

means for cooling the second fuel pump; and an electronic control unit that controls the operation of the fuel injectors.

47. The outboard motor recited in claim 46 further comprising a mechanical regulator that regulates pressure in the pressurized fuel line from the second fuel pump and in the fuel rail, and allows excessive fuel to flow to the fuel return line.

48. The outboard motor recited in claim 46 wherein the fuel reservoir is a vapor separation tank.

* * * * *